UNITED STATES PATENT OFFICE.

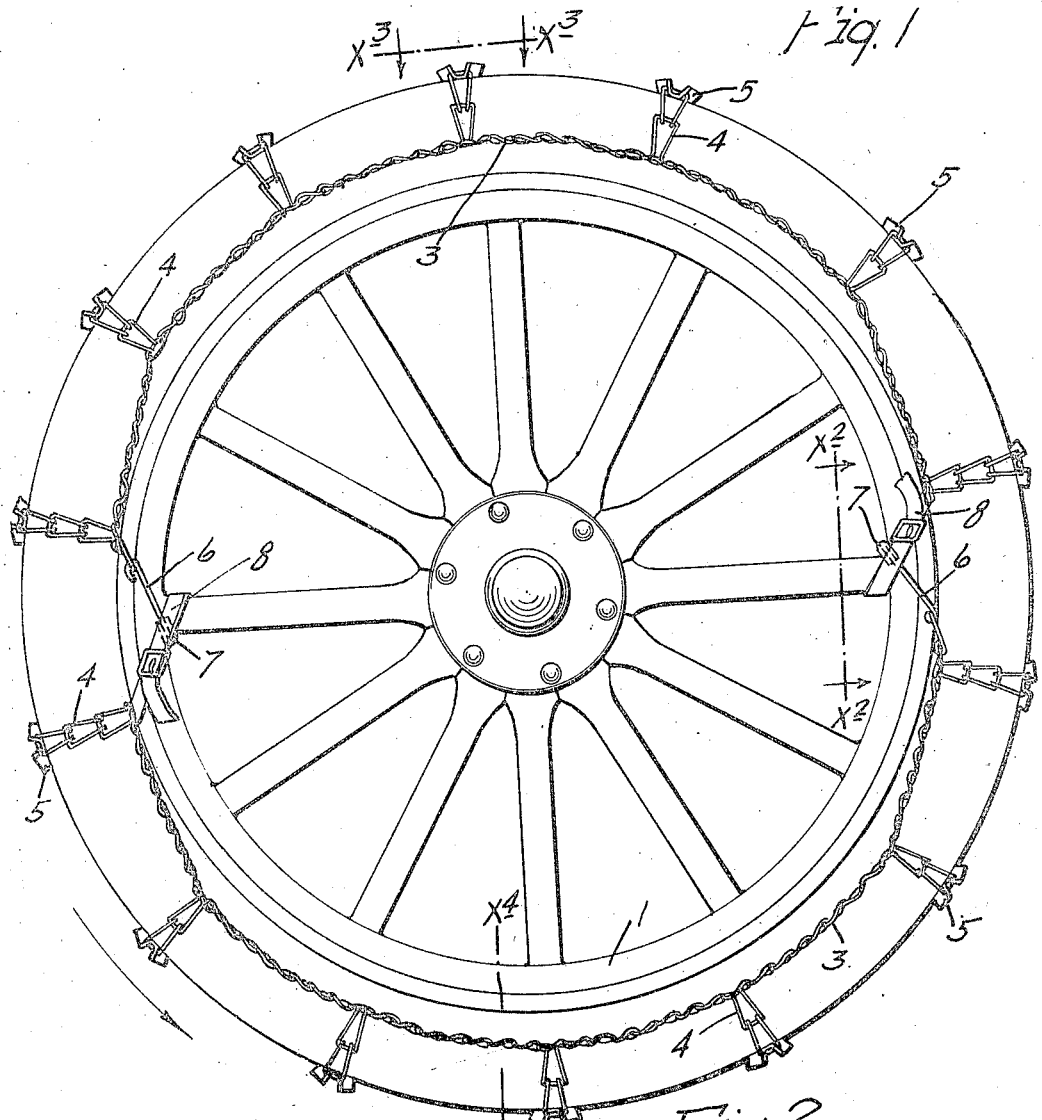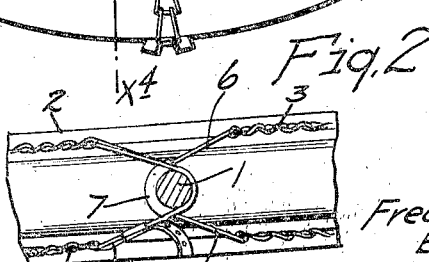

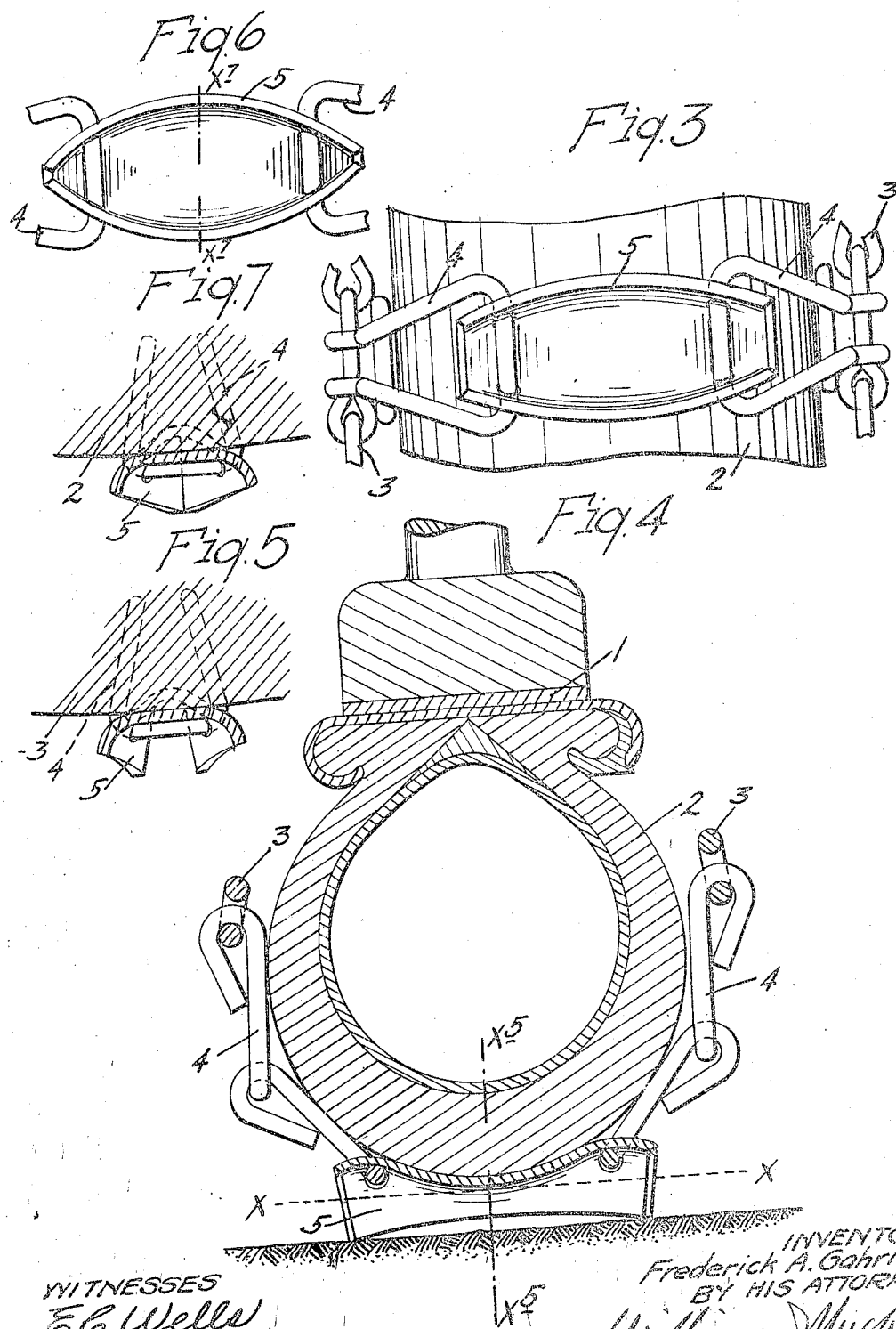

FREDERICK A. GAHRING, OF MINNEAPOLIS, MINNESOTA, ASSIGNOR OF ONE-HALF TO AXEL ANDERSON, OF MINNEAPOLIS, MINNESOTA.

NON-SKID SECTIONAL TIRE-CHAIN.

1,348,402.        Specification of Letters Patent.        Patented Aug. 3, 1920.

Application filed May 29, 1916. Serial No. 100,485.

*To all whom it may concern:*

Be it known that I, FREDERICK A. GAHRING, a citizen of the United States, residing at Minneapolis, in the county of Hennepin and State of Minnesota, have invented certain new and useful Improvements in Non-Skid Sectional Tire-Chains; and I do hereby declare the following to be a full, clear, and exact description of the invention, such as will enable others skilled in the art to which it appertains to make and use the same.

My present invention has for its object to provide an extremely simple and highly efficient non-skid tire chain especially adapted for application to the pneumatic tires of automobiles, but adapted, nevertheless, for more general use; and to such ends, generally stated, the invention consists of the novel devices and combinations of devices hereinafter described and defined in the claims.

The improved tire chain, for important reasons, is preferably made in two or more sections and each section comprises laterally spaced side chains and circumferentially spaced transverse connecting chains, the latter having metallic tread plates that directly engage with the ground or roadbed.

In the accompanying drawings which illustrate the invention in its preferred form, like characters indicate like parts throughout the several views. Referring to the drawings:

Figure 1 is a side elevation showing the complete tread chain applied to the pneumatic tire of an automobile wheel;

Fig. 2 is a fragmentary section on the line $x^2$ $x^2$ of Fig. 1;

Fig. 3 is a plan view of the parts found in the vicinity of the line marked $x^3$ $x^3$ on Fig. 1, showing the parts on a larger scale than in Fig. 1;

Fig. 4 is an enlarged section taken on the line $x^4$ $x^4$ of Fig. 1 showing also one of the tread plates in section;

Fig. 5 is a fragmentary vertical section taken on the line $x^5$ $x^5$ of Fig. 4;

Fig. 6 is a view corresponding to Fig. 3 but illustrating a slightly modified form of the so-called tread plates; and Fig. 7 is a section taken on the line $x^7$ $x^7$ of Fig. 6.

The numeral 1 indicates an automobile wheel of the usual or well known construction and the numeral 2 a pneumatic tire connected thereto in the usual or any suitable way. Each of the two sections of the complete tread chain comprises laterally spaced connecting chains 3, connected at suitable points by transverse chains 4 having as their intermediate links, channel-shaped tread plates 5. These channel-shaped tread plates 5 have out-turned flanges, the outer edges of which are concave, so that the end portions only thereof, rest upon the ground or roadbed (see particularly Fig. 4). The backs of the said tread plates are curved to fit the periphery of the tire and their ends are reversely curved so that no sharp parts will be exposed for engagement with the tire, even when the tire has flattened considerably. In Fig. 4, the dotted line $x-x$ is a horizontal line that intersects the most depressed portion of the top of the tread plate, and here it is important to note that the pivotal connection between the same and the connected links of the cross or transverse chains 4 are entirely above the said line $x-x$ so that said pivotal connections will not be destroyed even when the depending flanges of the tread plates are worn off to the said dotted line or to a line in which the depressed portions of the backs of said tread plates will bear upon the ground. The depending flanges of the tread plates are preferably reversely bulged, either as shown in Fig. 3, or to the greater extent shown in Fig. 6. For an important reason, the cross chains 4 which are at the ends of the connecting chains 3, are longer than the intermediate cross chains, so that the end portions of the said chains 3 will be brought considerably inward toward the axis of the wheel.

The laterally spaced connecting chains 3 of each of the two sections are connected to a U-shaped anchoring yoke 6. These anchoring yokes 6, at their crotches, are preferably covered with rubber hose 7, or the like, to prevent marring of the spokes when they are placed straddle thereof, as shown in Figs. 1 and 2. The chains 6, at their other ends, are attached to buckle-equipped straps 8, preferably of leather. These straps 8 may be passed through the end links of said chains 3 and they are then tightened in an opposite direction around the same spokes to which the yokes 6 are applied. When the tread chains are applied to the tire and wheel, as just stated, and as best shown in Figs. 1 and 2, they will be securely held against creeping or circumferential movements, and hence, will not allow the tire to spin within the chains and thus tear off the tread of the tire. The yokes 6, in addition to the functions already noted, will hold the ends of the chains 6 equally spaced on opposite sides of the tire. The tread plates give a very high degree of traction and prevent skidding. They may be easily applied and easily removed. Moreover, if one of the traction wheels be sunk deep into a mud hole or rut, one of the tread chain sections can be applied to the exposed upper portion thereof and used to get the wheel out of the rut or hole.

What I claim is:

1. A non-skid device for tires including circumferentially spaced transversely extended metal tread plates that are channel-shaped in cross section and have outstanding flanges, the edges of which are concavely curved so that only the ends thereof will primarily engage the ground.

2. A non-skid tire chain having transverse chain sections including metallic tread plates with outturned flanges exposed for engagement with the ground, the said flanges being in reverse convex arrangement converging at their ends, and the outer edges of said flanges being concave so that they engage the ground primarily at their end portions.

3. A non-skid device for tires including circumferentially spaced, transversely extended metal plates that are channel-shape in cross section and have laterally spaced ground-engaging flanges that are circumferentially and inwardly bowed to give the flanges of each channel a maximum distance at its intermediate portion and to extend the ends of said flanges outward for engagement with the ground.

In testimony whereof I affix my signature in presence of two witnesses.

FREDERICK A. GAHRING.

Witnesses:
CLARA DEMAREST,
B. G. WHEELER.